Oct. 4, 1955 P. B. MITCHELL 2,719,548
SAW GUIDE TOOL FOR PORTABLE POWER SAW
Filed March 26, 1954 2 Sheets-Sheet 1

INVENTOR.
*Paul B. Mitchell*
BY *Victor J. Evans & Co.*
ATTORNEYS

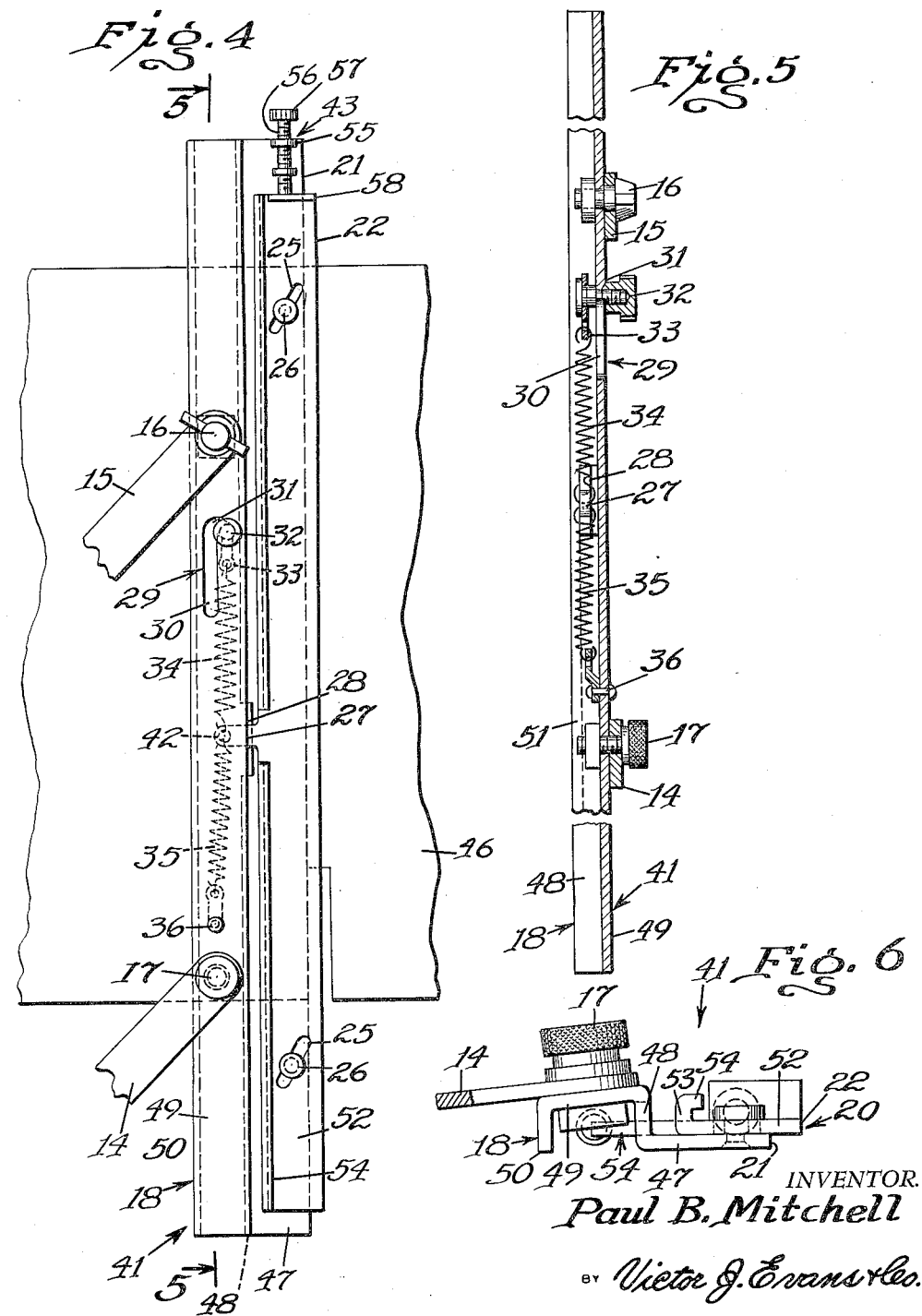

United States Patent Office 2,719,548
Patented Oct. 4, 1955

2,719,548

SAW GUIDE TOOL FOR PORTABLE POWER SAW

Paul B. Mitchell, Saskatoon, Saskatchewan, Canada

Application March 26, 1954, Serial No. 419,067

2 Claims. (Cl. 143—6)

This invention relates to a portable electric tool such as a saw, and more particularly to a portable guide for guiding an electric hand saw.

The object of the invention is to provide a portable guide for guiding hand type rotary power saws of the type driven by electricity.

Another object of the invention is to provide a saw guide which includes a straight edge against which the base of power saws can be rested and guided along a true and straight line, the present invention providing extreme accuracy when adjusted and wherein finishing work can be done quickly with a hand power saw without chipping or splintering fine surfaces.

Another object of the invention is to provide a saw guide tool wherein the user of the saw guide sees the exact area through which his cut will be made, and wherein the saw can be set to cut to right or left of a designated pencil mark.

A further object of the invention is to provide a saw guide tool which is extremely simple and inexpensive to manufacture.

Other objects and advantages will be apparent during the course of the following description.

In the accompanying drawings, forming a part of this application, and in which like numerals are used to designate like parts throughout the same:

Figure 4 is a plan view of the fence in adjusted position.

Figure 5 is a sectional view taken on the line 5—5 of Figure 4.

Figure 6 is an end elevational view of the fence.

Figure 1:
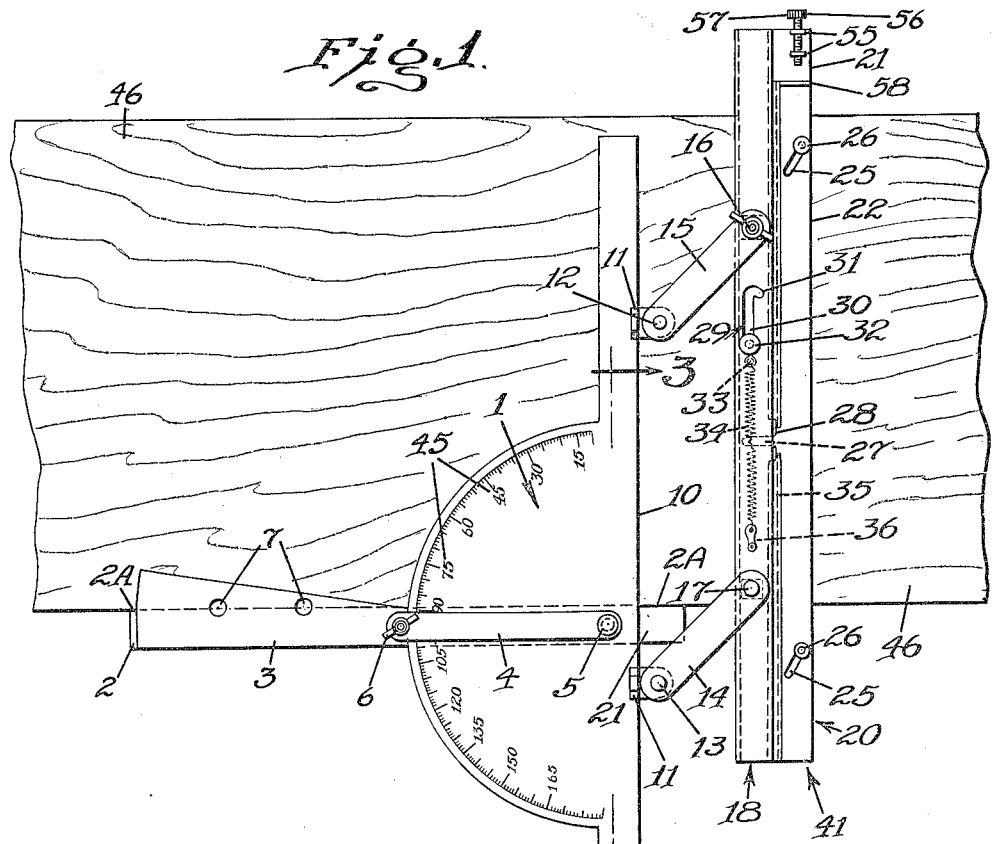
Figure 1 is a top plan view of the saw guide tool, constructed according to the present invention.
Figure 2:
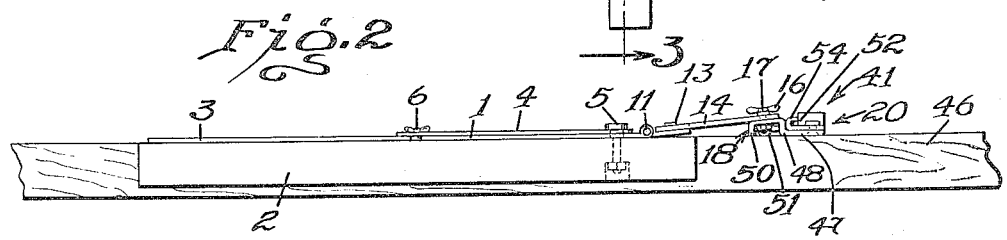
Figure 2 is an end elevational view of the tool.
Figure 3:
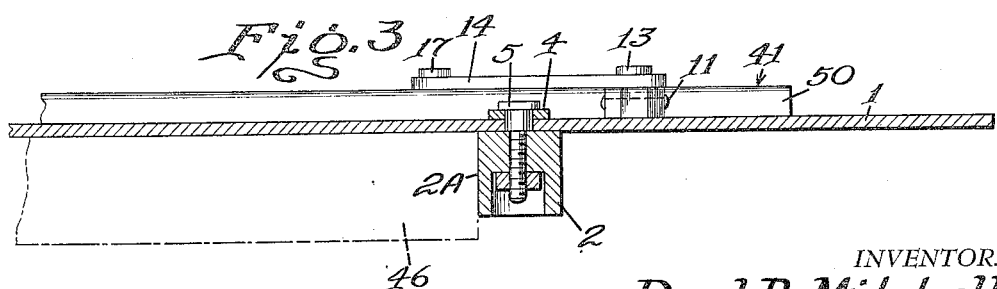
Figure 3 is a sectional view taken on the line 3—3 of Figure 1.

Referring in detail to the drawings, there is shown the tool of the present invention which includes a main calibration body 1 that has a rest stick 2 pivotally connected thereto by means of a pivot pin 5, Figure 1. Also connected to the main calibration body 1 by means of hinges 11, is a fence which is designated generally by the numeral 41.

The rest stick 2 is fastened beneath the calibration body 1 by means of the pivot mounting 5 in such a manner as to permit the stick to be moved through the arc of the calibration body 1, and the stick 2 is secured at the desired angle by means of a wing nut 6.

Secured to the top of the rest stick 2 is a plate 3, and the plate 3 overlaps the straight edge 2A and the rest stick 2 overlaps the straight edge 2A. The plate 3 is provided with a plurality of holes or apertures 7 whereby the user can observe contact made between the straight edge 2A and the lumber stock 46 to be sawed which rests against the edge 2A.

A calibration reading bar 4 is attached above the body 1, and a portion of the bar 4 overlaps a portion of the plate 3, the bar 4 being secured in place by means of the pivot mounting 5 and the wing nut 6.

The fence 41 is shown in detail in Figures 4, 5 and 6, and the fence 41 includes a support member 18 and a body member 20, and these parts are movable one with relation to the other. Arms 14 and 15 connect the fence 41 to the body 1, and these arms 14 and 15 swing in the same respective arcs from their attaching points 16 and 17, and the arms 14 and 15 are connected to the hinges 11 by means of pivot clamps 12 and 13, Figure 1. The fence 41 is connected to the main calibration body 1 in such a manner as to permit the outer edges 22 and 21 of the pieces 20 and 18, respectively, to remain parallel to the main calibration body saw lip 10 at all times.

The support member 18 is shaped to include a flat portion 47, and extending from the flat portion 47 is a web 48 which terminates in a strip or top portion 49, Figure 6. A flange 50 depends from the strip 49, and the parts 48, 49 and 50 cooperate to define a longitudinally extending channel or recess 51 for a purpose to be later described.

The body member 20 is shaped to include a body section 52, and extending upwardly from the body section 52 is a wall 53 which is provided with a transverse edge 54. The body section 52 is arranged contiguous to the flat portion 47, and the edges 21 and 22 remain parallel to each other at all times. The body section 52 of the body member 20 is provided with a pair of spaced parallel inclined slots 25, and extending through each of the slots 25 and into engagement with the flat portion 47 of the support member 18 is a pin 26. A control arm 27 extends from the body member 20 and projects through a slot or slit 28 in the web 48 of the support member 18.

There is further provided a kerf adjusting control pin 32 which is mounted for movement in a cutout 29 in the support member 18. The pin 32 has its ends projecting beyond both surfaces of the support member 18 so that it can be readily grasped by the user's thumb and forefinger whereby the pin 32 can be moved into the transverse portion 31 of the cutout 29 or into the straight portion 30 of the cutout 29. Secured to the pin 32 is a ring 33, and a spring 34 has one end connected to the ring 33. The other end of the spring 34 is arranged in engagement with an aperture 42 in the arm 27, and the spring 34 has very little tension placed on it except when the pin 32 is moved to the transverse portion 31 of the slot 29. A spring 35 also has an end arranged in engagement with the aperture 42 in the arm 27, and the other end of the spring 35 is anchored to the support member 18 by means of a pin 36. The spring 35 has sufficient tension to keep the control arm 27 down when the control button 32 is in the straight portion 30 of the slot 29. When the control pin 32 is moved to the transverse portion 31 of the slot 29, the spring 34 will overcome the weaker spring 35 to thereby cause the control arm 27 to be moved in the direction of the pin 32 and this consequently causes the body member 20 to move upwards and outward in a parallel fashion to the support member 18 due to the provision of the slanted slots 25 and the control pins 26. This movement produces a difference of relationship between the edges 21 and 22 which is controlled by means of a kerf setter control which is indicated generally by the numeral 43.

The kerf setter control 43 includes a pair of apertured ears 55, and adjustably engaging the ears 55 is a screw 56 which has a head 57 on one end thereof for rotating the screw. The inner end of the screw 56 is adapted to engage an upturned portion 58 on the support member 20, and the ears 55 are secured to the support member 18. By adjusting the position of the screw 56, the relative movement between the edges 21 and 22 can be controlled.

The relationship of the straight edges 21 and 22 to the saw guide lip 10 is controlled by adjusting the wing nut assembly 16 and the safety tension screw 17 which both permit the fence 41 and its straight edges 21 and 22 to take up a wide range of positions with respect to the saw guide lip 10.

Before using the saw guide tool of the present invention the angle of cut must be determined and the wing nut 6 loosened while the rest stick 2 is swung to the required calibration and then the wing nut 6 can be tightened. A piece of scrap lumber with a straight side is selected, and the saw guide tool is applied above the lumber in a manner that permits the edge 2A of the rest stick to rest against the lumber. The lumber must extend at least six inches to the right of the saw guide lip 10. Then, the tool of the present invention is held firmly against the lumber with the left hand and the fence 41 is swung back against the main calibration body 1 so that it lies flat. The base of the power saw is placed against the saw guide lip 10 and a one-inch cut is made into the lumber and then the saw is removed. Still holding the tool in its original position and without moving it, the fence 41 is swung forward as shown in Figure 1 and the wing nut 16 is loosened and the fence is moved so that the support member 18 has its edge 21 directly on the inner edge of the saw kerf cut and then the wing nut 16 is tightened. Next, the kerf adjusting control pin 32 is moved to the transverse portion 31 of the slot 29 and the control 43 is adjusted so as to bring the edge 22 of the body member 20 directly in line with the outer edge of the saw kerf that was cut in the lumber.

The saw guide tool is now ready to perform accurate cuts but it is to be understood that the operator must recognize that the straight edges 21 and 22 are either flush, or the edge 22 is advanced the width of the saw kerf cut by the power saw being used. If the edges 21 and 22 are flush and placed directly on a pencil mark indicating a place of cut, and the fence is moved back upon the calibration body, the saw will describe a cut to the right of the pencil mark in a manner so as to thereby leave the board to the left of the mark uncut.

This is repeated and the control pin 32 is moved to the take-up position 31 so that the edge 22 is advanced apart from the edge 21. Next, the edge 22 is placed on the same pencil mark and the fence is swung back over the calibration body and the cut is made. It will be seen that the cut is on the left side of the pencil mark and the right hand side of the mark is uncut. Or, if the pin 32 is at the portion 30 of the slot 29, the cut will be to the right of the line and if the pin 32 is at the portion 31 the cut will be to the left of the line.

Once an adjustment has been made for a particular piece of work, additional support can be given the wing nut assembly 16 by further tightening the screw pivot 17 to thereby insure that the fence will not accidentally be moved even through it may be bumped in the course of being used. It is important that a trial test cut be made if for any reason it is thought that the saw guide may have become knocked out of adjustment. When the blade of the saw it tilted for under-cutting, a readjustment will be necessary both for saw distance to the saw guide lip and for the kerf width which is wider when cutting other than a ninety degree cut.

The present invention thus is directed to a tool which has a straight edge against which the base of most power saws can be rested and guided along a true and straight line and there is provided an adjustable straight edge against which the edge of most power saws can be rested and guided while making angular cuts along a true and straight line. The calibrating plate 1 forming a part of this tool may have transcribed thereon angle bearing degrees as well as other indicia such as house framing data so that workmen can readily select the angle course to be sawn without the need of other tools or calibrating devices. Furthermore, workmen will be able to cut on right or left side of a given mark with a hand power saw without any guess work, and the tool can be used as a mitering tool for hand power saws and finishing work can be done quickly with a hand power saw without chipping and splintering fine surfaces. The tool can be used for all kinds of house framing and fitting, bevel cuts on shiplap siding, window and door framing, stair construction and the like, and the tool will permit a workman to examine and see the line of saw cut actually required as well as execute the saw cut with the power saw and find the result without any deviation. Further, the present invention does not require the workman to follow the line of cut while sawing is in progress so that the chance of injury to the eyes from splinters and saw-dust is eliminated, and the tool reduces any chance of jamming because the cut is straight and no compensations by means of pressure on the blade are necessary as a result of an off-line saw start. The tool is practical, light and durable, and can be manufactured at low cost, and every cut performed is equal to or superior to a miter box cut. Furthermore, ordinary wastage losses caused by inaccurate cuts will be eliminated, and in many instances a steel square will not be necessary since the tool functions as a set square and bevel square used for taking off angles, and the tool can be readily carried in a workman's tool box.

As soon as the fence 41 has performed its previously described function it is folded back upon the body 1 and the fence 41 lays flat upon the body 1 and the fence can be folded back upon the body of the tool with minimum clearance. Since the arms 14 and 15 of the fence must be attached to the top of the fence, the strip or top section 49 is arranged angularly as shown in Figure 6.

The edges 21 and 22 of the tool, when adjusted, are capable of handling any width stock lumber up to and above twelve inches if made in practical and useful size and these same sizes can be sawn regardless of the angle selected. Further, with the present invention it is possible to pick up a mark location with the fence edges 21 or 22 regardless of whether the mark is made at the top or bottom of the board face since the fence edges 21 or 22 lay across the whole board surface instead of touching one point. Also, the saw is designed to be set to cut to right or left of the designated pencil mark depending upon whether the right or left of the lumber was required. When the guide is properly set, the saw will skim out half of the pencil mark as it cuts to either side of the mark as required. In use the frame of the saw rests against the guide lip 10 and this lip can vary in height. The left hand lays across the plate 3 with the thumb resting beneath the tool and holding it firmly against the work. Now assume that the electric hand saw of the rotary type has been used and the test cut has been made. Next, this distance is recorded for future cuts, that is the distance between the cut and the guide lip. The fence is hinged, so that it is lifted up and moved to the position shown in Figure 1. Thus, the edges 22 and 21 are directly over and beneath the other respectively so that they form one edge. It is also to be noted that the edges 22 and 21 do not reach the left hand edge of the saw blade kerf. Still holding the calibration body in the same relative position as of the time of the test cut, the wing nut 16 is loosened and the edges 22 and 21 are made to lay directly over and on the left edge of the kerf. The wing nut 16 is securely tightened as well as the safety screw 17.

A thumb screw control 56 serves to advance or retard the offset of the blade 22 until it is directly over the right side of the saw blade kerf. Once this setting is fixed the tool is ready to perform cuts to the right or left side of a finely scribed mark with 100% accuracy. The accuracy this tool provides makes it possible to line split a fine scribed mark to the left or right of the mark and in a manner that leaves half of the line when the cut is completed.

Since the saw guide tool of the present invention is set up for accurate cuts by the previously outlined procedure, it is now ready to perform. For the first cut, the pin 32 is released and this brings both edges of 22 and 21 together, and since 21 was set to the left edge of the saw kerf, it will be noted that whatever mark this leading edge is placed upon or over, that the saw blade will cut a kerf to the right of edges 22 or 21. Looking down on the edge formed by 22 and 21 the operator sees the actual line his saw will cut. The operator of the saw folds the fence back over the tool and resting the saw frame against the guide lip 10, the cut is made.

The purpose of the blade 22 now becomes apparent. Moving the pin 32 causes the blade 22 to advance the width of the saw blade kerf. When the fence is placed over a mark on a piece of stock, the guide lip is the equivalent of one saw blade kerf further from the mark on the piece of stock than it would be if the pin 32 were released. The result causes the saw blade to cut to the left of the mark. Hence, we establish control of the electric hand saw with the tool.

Once the fence and the kerf have been set for a particular saw, it is not necessary to alter the settings, except in cases where the power saw is set to make undercuts, in which case the saw is usually tilted inward. When cuts of this nature are necessary, a test cut must be made and the saw guide tool reset, as well as the saw kerf control because the tilted approach of the blade will produce a larger kerf.

I claim:

1. In a saw guide tool, a calibration body having a straight lip extended upwardly therefrom, a rest stick pivotally connected about a vertical axis to said body, a fence movably connected to said body, said rest stick being positioned below said body and having a straight edge, a plate secured to the top of said rest stick and overlapping said straight edge, a calibration reading bar positioned above said calibration body and overlapping a portion of said plate, said fence including a support member and a body member, a pair of arms arranged in spaced parallel relation with respect to each other, said arms each having an end hingedly connected about a horizontal axis to said body and also pivoted about a normally vertical axis to said body and their other ends pivotally connected about normally vertical axes to said support member, the outer edges of said support member and body member being parallel to the lip of said body at all times, said support member including a flat portion, a longitudinally extending web extending upwardly from said flat portion, a strip extending from said web and arranged angularly with respect thereto, a flange depending from said strip, said body member including a body section arranged contiguous to said flat portion, a wall extending upwardly from a longitudinal edge of said body section and having its upper edge extending transversely, there being a pair of spaced parallel slots in the body section of said body member, pins extending through said slots and into engagement with said flat section, there being a slit in said web, a control arm extending from said body member and projecting through said slit, there being a cutout in said strip including a straight portion and a transverse portion, a control pin slidably mounted in said cut-out, a ring secured to said pin and positioned below said strip, a first coil spring having one end connected to said ring and its other end connected to said control arm, a second coil spring having one end connected to said control arm and its other end anchored to said support member, there being a plurality of holes in said plate for observing contact made between said rest stick and the lumber stock to be sawed which rests against said straight edge.

2. The apparatus as described in claim 1, and further including a kerf setter control on said fence including a pair of spaced parallel ears extending upwardly from said flat section, and adjusting screw engaging said ears, and a raised edge on an end of said body member adapted to be engaged by said adjusting screw.

References Cited in the file of this patent

UNITED STATES PATENTS

| | | |
|---|---|---|
| 759,647 | Updegraff | May 10, 1904 |
| 836,110 | Giffin | Nov. 20, 1906 |
| 842,489 | Overholt | Jan. 29, 1907 |
| 1,535,596 | French | Apr. 28, 1925 |
| 1,544,290 | Walstad | June 30, 1925 |
| 1,799,738 | Dirschauer et al. | Apr. 7, 1931 |
| 1,832,283 | Earhart | Nov. 17, 1931 |
| 1,911,045 | Tinnen | May 23, 1933 |
| 2,596,524 | Bridwell | May 13, 1952 |
| 2,632,483 | Jamack | Mar. 24, 1953 |
| 2,634,767 | Chappell | Apr. 14, 1953 |

FOREIGN PATENTS

| | | |
|---|---|---|
| 566,179 | France | Nov. 19, 1923 |